United States Patent [11] 3,545,771

[72] Inventors James W. Downing
 Buena Park;
 Teunes Verhoeven, Lakewood, California
[21] Appl. No. 781,054
[22] Filed Dec. 4, 1968
[45] Patented Dec. 8, 1970
[73] Assignee McDonnell Douglas Corporation
 a corporation of Maryland

[54] FLUID SEAL HAVING CONJUGATE SPLIT ELEMENTS
 2 Claims, 5 Drawing Figs.
[52] U.S. Cl. ................................................. 277/187,
  277/124, 277/198
[51] Int. Cl. ..................................................... F16j 15/00,
  F16j 9/16
[50] Field of Search ..................................... 277/187,
  165, 47, 49, 194, 198, 4, 156, 124, 189, 105

[56] References Cited
 UNITED STATES PATENTS
2,056,687 10/1936 Moseley ........................ 277/105

| 2,596,174 | 5/1952 | Reich | 277/49 |
| 2,990,220 | 6/1961 | Malone | 277/187 |
| 3,062,555 | 11/1962 | Britton | 277/124X |
| 3,120,394 | 2/1964 | Gould | 277/124 |

Primary Examiner—Samuel D. Rothberg
Attorneys—Walter J. Jason, Donald L. Royer and D. N. Jeu ABSTRACT: An easily installable and removable seal for precluding leakage of fluid through the clearance space between a shaft and a panel opening through which the shaft extends. The seal includes a split, ring-shaped, base element fitted on the shaft and positioned axially against the panel about the opening, a conjugate split, ring-shaped, cover element fitted on the shaft and nested axially against the base element, and a disc-shaped bracket secured to the panel about the shaft for applying axial pressure to the peripheral portions of the nested seal elements and retaining the same continuously in proper sealing position.

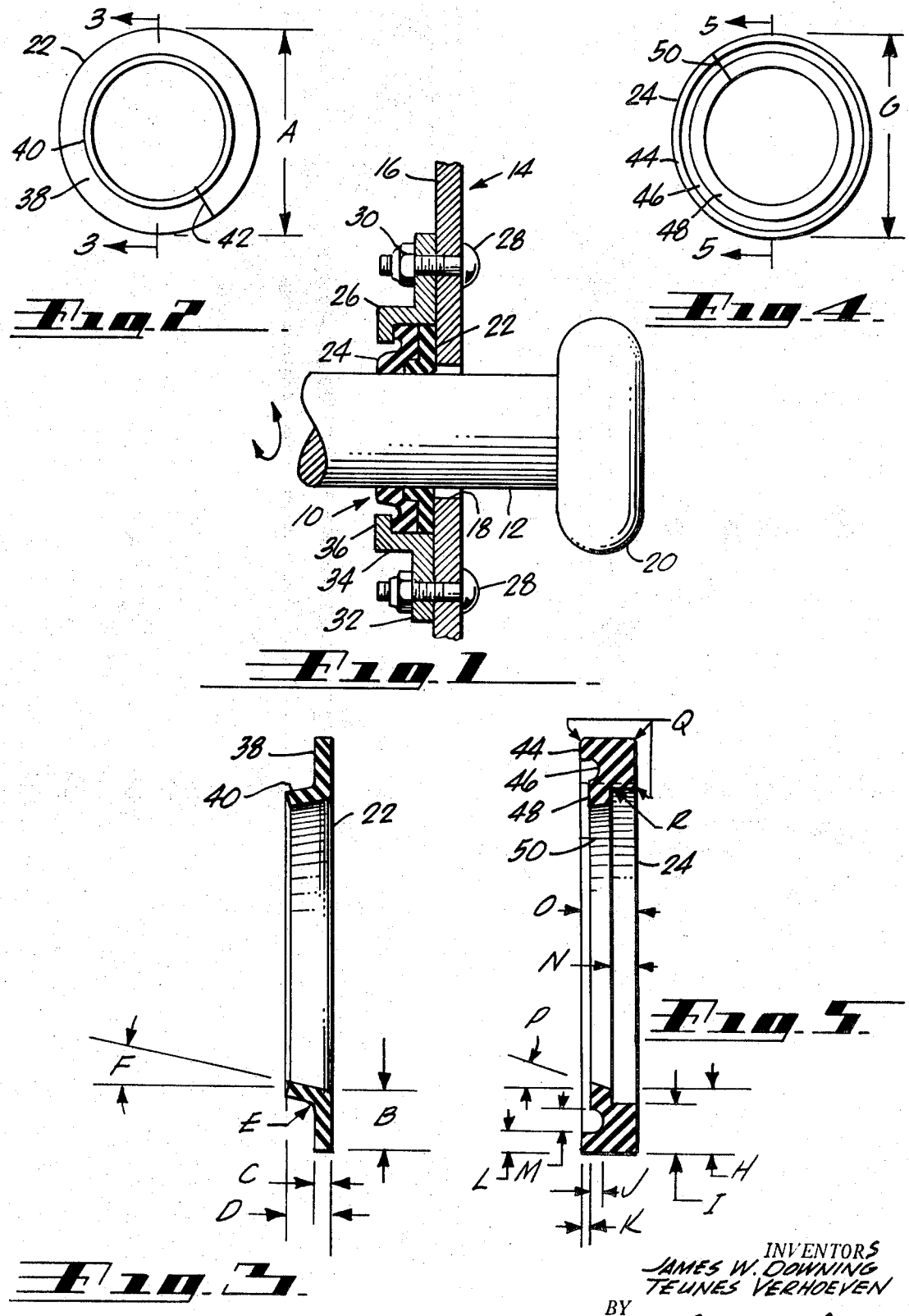

3,545,771

FLUID SEAL HAVING CONJUGATE SPLIT ELEMENTS

BACKGROUND OF THE INVENTION

Our present invention pertains generally to the field of seals and more particularly to a simple and effective fluid seal which can be easily installed or removed.

A seal is commonly provided at the panel opening through which an operating shaft extends, to preclude leakage of fluid through the clearance space between the shaft and opening. There is a problem, however, of installing or removing a conventional fluid seal in that it is normally necessary to slide the seal over the shaft to or from its installation position. Besides the problem of installation, there is also the difficulty in obtaining a positive seal with the conventional seal. Thus, it is generally required to maintain fairly strict tolerances for the shaft and the associated panel structure dimensions, and for the shaft deflections allowed during operation thereof, in order to obtain a positive seal with the conventional seal.

SUMMARY OF THE INVENTION

Briefly, and in general terms, our invention is preferably accomplished by providing a fluid seal utilizing conjugate split elements for precluding leakage of fluid through the clearance space between an operating shaft and a panel opening through which the shaft extends. The fluid seal includes a split, ring-shaped, base element fitted firmly on the shaft and positioned axially against the panel about its opening, a conjugate split, ring-shaped, cover element fitted firmly on the shaft and nested axially against the base element, and a disc-shaped bracket secured to the panel about the shaft for applying pressure axially to the peripheral portions of the nested seal elements and retaining the same in proper sealing position at all times. The split in the base element is preferably separated approximately 180° from the split in the cover element. Thus, the seal elements are axially nested together such that the split in each element is sealed by the unbroken portion of the other element.

The advantages of this fluid seal having conjugate split elements include the ease of installing or removing such a seal on or off an operating shaft without having to slide the seal over the shaft to or from its installation point, the relaxation permissible of the relatively strict tolerances for the shaft and the associated panel structure dimensions and still obtaining a positive seal therewith, and the greater shaft deflection allowable during operation with a two-element seal, wherein conjugate seal elements are axially nested together on the shaft, without incurring leakage therethrough.

BRIEF DESCRIPTION OF THE DRAWING

Our invention will be more fully understood, and other features and advantages thereof will become apparent, from the description given below of an exemplary embodiment of the invention. This description of the exemplary embodiment of the invention is to be taken in conjunction with the accompanying drawing, in which:

FIG. 1 is a central sectional and elevational view of a seal according to this invention as used illustratively with a shaft for actuating the latch of a door;

FIG. 2 is a rear elevational view of one element 5 of the seal;

FIG. 3 is an enlarged sectional and elevational view of the element shown in FIG. 2, as taken along the line 3–3 indicated therein;

FIG. 4 is a rear elevational view of the other element of the seal; and

FIG. 5 is an enlarged sectional and elevational view of the element shown in FIG. 4, as taken along the line 5–5 indicated therein.

DESCRIPTION OF THE PRESENT EMBODIMENT

FIG. 1 is a central sectional and elevational view of a seal 10 constructed and assembled according to our invention, and used illustratively with a latch actuating shaft 12 of a door 14. The seal 10 is suitably mounted to door panel 16 on the shaft 12 which extends through the seal 10 and an associated circular opening 18 in the door panel 16. A door handle 20 is suitably affixed to the outer end of the shaft 12. The shaft 12 is fixed in position axially with respect to the panel 16 by suitable door fixtures (not shown) but can be rotated either clockwise or counterclockwise on its axis by the door handle 20 to unlatch or latch the door 14. The seal 10 includes a ring-shaped base element 22 and a conjugate ring-shaped cover or pressure element 24. The base element 22 is installed on the shaft 12 against the inner surface of the panel 16, and the conjugate cover element 24 is installed on the shaft 12 nested against the base element 22. A symmetrical, disc-shaped, retaining bracket 26 is secured to the panel 16 by a suitable number of screws 28 and nuts 30, and is appropriately formed to hold radially and compress axially the seal elements 22 and 24.

The bracket 26 includes a radially outer flange 32, a circular collar 34 and a collar lip 36. The flange 32 is radially wide enough to accommodate the screws 28 and nuts 30 which are preferably spaced equally around the flange 32. The bracket 26 has an inner cylindrical diameter which is nominally equal to the outer ring diameter of the undeformed cover element 24, and prevents the element 24 from being radially deformed outwardly by axial compression thereof. The base element 22 has an outer ring diameter which is slightly smaller than that of the cover element 24. The bracket 26 has an inner cylindrical length extending axially from the (right) surface of flange 32, flush with the inner surface of panel 16, to the inner surface of the lip 36 somewhat shorter than the normal, undeformed, combined peripheral axial lengths of the seal elements 22 and 24. Thus, the inner surface of lip 36 of the bracket 26 engages the corresponding peripheral edge surface of the cover element 24 and, as the bracket 26 is tightened by the screws 28 and nuts 30 to the panel 16, the cover element 24 axially compresses the base element 22 so that both seal elements 22 and 24 are firmly secured in place by the bracket 26. The cover element 24 is prevented by the bracket 26 from being radially deformed outwardly and will compress the base element 22 which is then radially deformed outwardly until it engages the inner cylindrical wall of the bracket 26.

The diameter of the latch actuating shaft 12 is, for example, one-sixteenth inch larger than the minimum diameter of the central opening in the cover element 24. The diameter of the opening 18 in panel 16 can be approximately one-eighth inch larger than the diameter of the shaft 12. Since the minimum diameter of the central opening in the base element 22 is only slightly smaller than that in the cover element 24, the seal elements 22 and 24 can be both stretched a small amount to fit firmly on the chart 12. The shaft is 12 is normally operated intermittently and is rotated relatively slowly in unlatching or latching the door 14. The seal 10 is also used in an air environment. Under these operating conditions, the seal elements 22 and 24 are preferably made of natural rubber having a Shore hardness of 60, for example. Where, however, the seal 10 is used on a shaft which is normally operated relatively continuously and is rotated at fairly high speeds, the seal elements 22 and 24 are preferably fabricated of much harder rubber.

FIG. 2 is a rear elevational view of the base element 22. The element 22 is ring-shaped, and includes a peripheral flange 38 and collar 40. The base element 22 is axially cut radially to provide a split 42 in the element 22 as illustrated. The split 42 in the base element 22 permits the element 22 to be installed on and removed from the shaft 12 without the need of removing the shaft 12, or having to slide the element 22 over the length of the shaft 12 and off its end. The base element 22 is cut after molding to provide the split 42. The outer cylindrical diameter A of the base element 22 is, for example, 1,750 inch.

FIG. 3 is an enlarged sectional and elevational view of the base element 22 as taken along the line 3–3 indicated in FIG. 2. Dimension B is 0.257 to 0.267 inch, dimension C is 0.062 inch (constant), and dimension D is 0.187 inch, for example. Radius E is 0.030 inch and angle F is 10° in this illustrative example of the base element 22. The angle F produces good sealing contact of the collar 40 of element 22 with the shaft 12 and, also, tends to prevent movement of the element 22 on the shaft 12 to the left in FIG. 1. It is to be understood, of course, that the specific types of materials and particular dimensions noted herein are merely given as examples only, and are not to be taken as limiting on the invention in any manner.

FIG. 4 is a rear elevational view of the cover element 24. The element 24 is also ring-shaped, and includes a peripheral ridge 44, an adjacent groove 46 concentric to the ridge 44 and a radially inner flange 48. The cover element 24 is also axially cut radially to provide a split 50 in the element 24 as illustrated. The split 50 in the cover element 24 permits the element 24 to be installed on and removed from the shaft 12 without the need of removing the shaft 12, or having to slide the element 24 over the length of the shaft 12 and off its end. The cover element 24 is cut after molding to provide the split 50. The outer cylindrical diameter G of the cover element 24 is, for example, 1.770 inch. This is slightly larger (0.020 inch) than the outer cylindrical diameter A (FIG. 1) of the base element 22.

FIG. 5 is an enlarged sectional and elevational view of the cover element 24 as taken along the line 5–5 indicated in FIG. 4. Dimension H is 0.257 to 0.267 inch, dimension I is 0.195 to 0.205 inch, dimension J is 0.045 inch, dimension K is 0.032 inch, dimension L is three thirty-seconds inch, dimension M is 0.093 inch, dimension N is 0.145 to 0.155 inch and dimension O is 0.240 to 0.250 inch., for example. The groove 46 is formed with a full radius and the upper limit of the dimension L is at the outer edge of the full radius forming the groove 46. Angle P is 10°, radii Q are each 0.030 inch and radius R is 0.000 to 0.005 inch in this illustrative example of the cover element 24. The angle P is provided on the flange 48 of element 24 for the same purpose as the angle F (FIG. 3) was provided on the collar 40 of element 22. It can be seen that the flange 38 and collar 40 (FIG. 3) of the base element 22 will be nested firmly against the right surface of the radially outer portion of the cover element 24 and in the open channel formed immediately to the right of the radially inner flange 48 (FIG. 5), when the seal 10 is installed as shown in FIG. 1.

The base element 22 is installed on the shaft 12 as shown in FIG. 1 with the split 42 located in a position such as illustrated in FIG. 2. The cover element 24 is preferably installed on the shaft 12 as shown in FIG. 1 with the split 50 located in a position such as illustrated in FIG. 4. The two elements 22 and 24 are thus axially nested together with the splits 42 and 50 separated 180° apart, and the split in each element is sealed by the unbroken portion of the other element. It is noted that the cover element 24 is distorted in shape generally to that indicated in FIG. 1 when the inner surface of the lip 36 of the bracket 26 engages the corresponding surface of the peripheral ridge 44 of the cover element 24, and the bracket 26 has been tightened by the screws 28 and nuts 30 to compress the ridge 44 of the element 24. The base element 22 is primarily compressed at its flange 38, and is not normally distorted as much as the cover element 24. Also, the groove 46 is necessary to retain sealing pressure of the cover element 24, and indirectly of the base element 22, against the shaft 12. The groove 46 generally isolates or separates the peripheral axial pressure effects on the ridge 44 from detrimentally affecting the sealing contact of the flange 48 to the shaft 12. The seal 10 could otherwise leak if the groove 46 were omitted from the cover element 24.

It is to be understood that the particular embodiment of our invention as described above and shown in the accompanying drawing is merely illustrative of, and not restrictive on, the broad invention and that various changes in design, structure and arrangement may be made without departing from the true spirit of the invention.

We claim:

1. In a shaft extending through an opening in a panel and having a radial clearance space between said shaft and said opening, sealing means for precluding leakage of fluid through said clearance space, said sealing means comprising:
   a ring-shaped base element fitting firmly on said shaft and positioned axially against said panel about said opening;
   a conjugate ring-shaped cover element fitting firmly on said shaft and nested axially against said base element; and
   means for applying axial pressure to the peripheral edge portions of said cover and base elements whereby said cover element is maintained in firm axial contact with said base element and said base element is maintained in firm axial contact with said panel, said base and cover elements being each axially divided radially to provide respective splits which are located in positions circumferentially separated from each other whereby said base and cover elements are nested together with the split in each element sealed by an unbroken portion of the other element, and wherein said base element includes a peripheral flange and a collar, said collar of said base element fitting firmly on said shaft, and said cover element includes a peripheral ridge, an adjacent groove concentric to said ridge and a radially inner flange forming an open channel axially to one side thereof, said radially inner flange of said cover element fitting firmly on said shaft, and said ridge transmitting axial pressure to said peripheral flange of said base element, said groove generally isolating axial pressure effects on said ridge from affecting the sealing contact of said radially inner flange of said cover element to said shaft, said peripheral flange of said base element being nested firmly against the axially adjacent surface of the radially outer portion of said cover element, and said collar of said base element being nested firmly in said open channel.

2. The invention as defined in claim 1 wherein said means for applying axial pressure includes a disc-shaped bracket having a radially outer flange, a circular collar and a collar lip, said radially outer flange of said bracket being secured to said panel with said collar lip positioned about and spaced from said shaft, said bracket having an inner cylindrical diameter nominally equal to the outer diameter of said cover element in the undeformed condition, and an inner cylindrical axial length shorter than the combined peripheral axial lengths of said base and cover elements in their undeformed conditions, and said collar lip of said bracket engaging said ridge of said cover element whereby when said bracket is tightened to said panel, said collar lip applies pressure axially to said ridge of said cover element and said peripheral flange of said base element nested thereagainst, to secure said base and cover elements firmly in position.